(12) United States Patent
Ma et al.

(10) Patent No.: US 10,805,569 B2
(45) Date of Patent: Oct. 13, 2020

(54) COLUMN-INTERLEAVED PIXEL ARRAY

(71) Applicant: Gigajot Technology Inc., Pasadena, CA (US)

(72) Inventors: Jiaju Ma, Monrovia, CA (US); Saleh Masoodian, Monrovia, CA (US)

(73) Assignee: Gigajot Technology, Inc., Pasadena, CA (US)

( * ) Notice: Subject to any disclaimer, the term of this patent is extended or adjusted under 35 U.S.C. 154(b) by 0 days.

(21) Appl. No.: 16/776,481

(22) Filed: Jan. 29, 2020

(65) Prior Publication Data

US 2020/0244910 A1    Jul. 30, 2020

Related U.S. Application Data

(60) Provisional application No. 62/798,197, filed on Jan. 29, 2019.

(51) Int. Cl.
*H04N 5/378* (2011.01)
*H04N 9/04* (2006.01)

(52) U.S. Cl.
CPC ......... *H04N 5/378* (2013.01); *H04N 9/0455* (2018.08)

(58) Field of Classification Search
CPC .. H04N 5/378; H04N 9/0455; H04N 5/33536; H01L 27/14636; H01L 27/14638
See application file for complete search history.

(56) References Cited

U.S. PATENT DOCUMENTS

| | | |
|---|---|---|
| 8,130,304 B2 | 3/2012 | Yin et al. |
| 8,513,760 B2 | 8/2013 | Park |
| 8,913,168 B2 * | 12/2014 | Matsuda ........... H01L 27/14603 348/281 |
| 9,774,801 B2 | 9/2017 | Hseih et al. |
| 9,832,405 B2 | 11/2017 | Abe et al. |
| 10,050,073 B2 * | 8/2018 | Ishiwata ........... H01L 27/14627 |
| 2009/0046189 A1 | 2/2009 | Yin et al. |
| 2009/0090845 A1 | 4/2009 | Yin et al. |
| 2011/0176045 A1 * | 7/2011 | Ahn ................. H01L 27/14641 348/308 |
| 2011/0221941 A1 | 9/2011 | Sato |
| 2011/0273598 A1 * | 11/2011 | Ogino ................ H04N 9/045 348/272 |
| 2012/0175498 A1 | 7/2012 | Krymski |
| 2015/0029373 A1 * | 1/2015 | Yamaguchi ........ H04N 9/045 348/308 |
| 2016/0165159 A1 * | 6/2016 | Hseih ................. H04N 5/37457 348/273 |
| 2016/0204160 A1 | 7/2016 | Itonaga et al. |
| 2017/0201702 A1 * | 7/2017 | Niwa ............... H01L 27/14645 |
| 2017/0302872 A1 * | 10/2017 | Tanaka ............. H04N 5/37457 |
| 2017/0338262 A1 * | 11/2017 | Hirata .................. H04N 5/374 |
| 2018/0027192 A1 * | 1/2018 | Morisaki ........... H04N 5/37457 348/308 |

OTHER PUBLICATIONS

Invitation to Pay Additional Fees, Partial International Search Report, and Written Opinion dated Apr. 15, 2020 in International Application No. PCT/US2020/015743, 10 pages.

* cited by examiner

*Primary Examiner* — Nhan T Tran
(74) *Attorney, Agent, or Firm* — Charles Shemwell

(57) ABSTRACT

Shared-readout pixels conventionally disposed in two or more physical columns of a pixel array are spatially interleaved (merged) within a single physical column to yield a pixel array in which each physical pixel column includes two or more logical columns of shared-readout pixels coupled to respective logical-column output lines.

15 Claims, 4 Drawing Sheets

Column-Interleaved Pixel Array

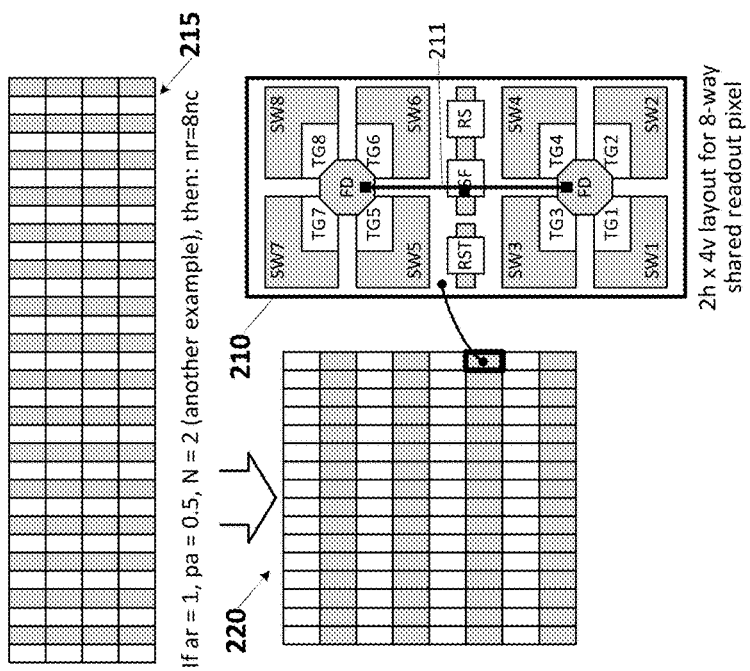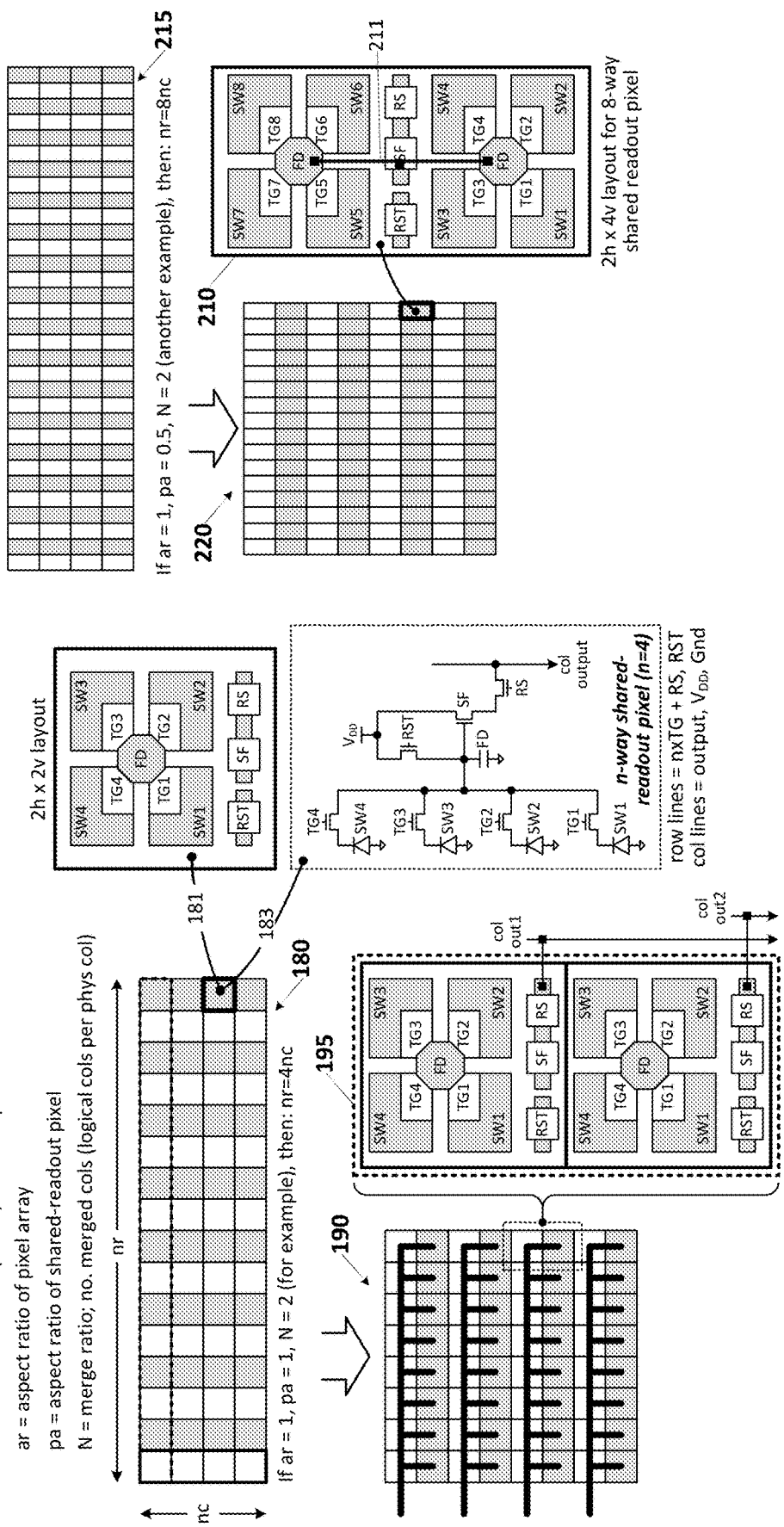

Sub-Pixel Column Interleaving

COLUMN-INTERLEAVED PIXEL ARRAY

CROSS-REFERENCE TO RELATED APPLICATIONS

This application hereby claims priority to and incorporates by reference U.S. provisional application No. 62/798,197 filed Jan. 29, 2019.

TECHNICAL FIELD

The disclosure herein relates to integrated-circuit image sensors.

INTRODUCTION

Complementary metal oxide semiconductor (CMOS) image sensors are widely used in various imaging applications, such as consumer, industrial, and scientific imaging applications. Driven by the pursuit of higher spatial resolution and more compact sensor size, the pitch size of the pixels has been undergoing a rapid shrinking trend. Enabled by the advanced CMOS fabrication technologies, pixels with sub-micron pitch size (0.8 um and 0.7 um) have been used in consumer products.

Predominant constraints for further shrinking the CMOS pixel size include (i) the area required for transistors needed to read out the pixel signal, (ii) the minimum width, area, and spacing for the pixel implantation masks, and (iii) the minimum width and spacing for the metal wires that provide pixel control signals. While shared readout architectures are widely used to overcome the readout-transistor area and implantation-mask constraints (i.e., sharing a capacitive/floating-diffusion node, source-follower transistor and read-select transistor for multiple photodetection elements), those same architectures generally increase the requisite number transfer-gate control lines per pixel row (due to the separate transfer gate (TG) and TG control line needed for each photodetection element), driving up wire count and often forcing designers to compromise pixel performance to meet tight wire-spacing constraint.

DRAWINGS

The various embodiments disclosed herein are illustrated by way of example, and not by way of limitation, in the figures of the accompanying drawings and in which like reference numerals refer to similar elements and in which:

FIG. 2 illustrates considerations bearing on organization of a merged-column pixel array;

FIG. 3 illustrates another merged-column pixel-organization example, in this case assuming an 8-way shared-readout pixel having a non-unity aspect ratio;

DETAILED DESCRIPTION

Figure 1:
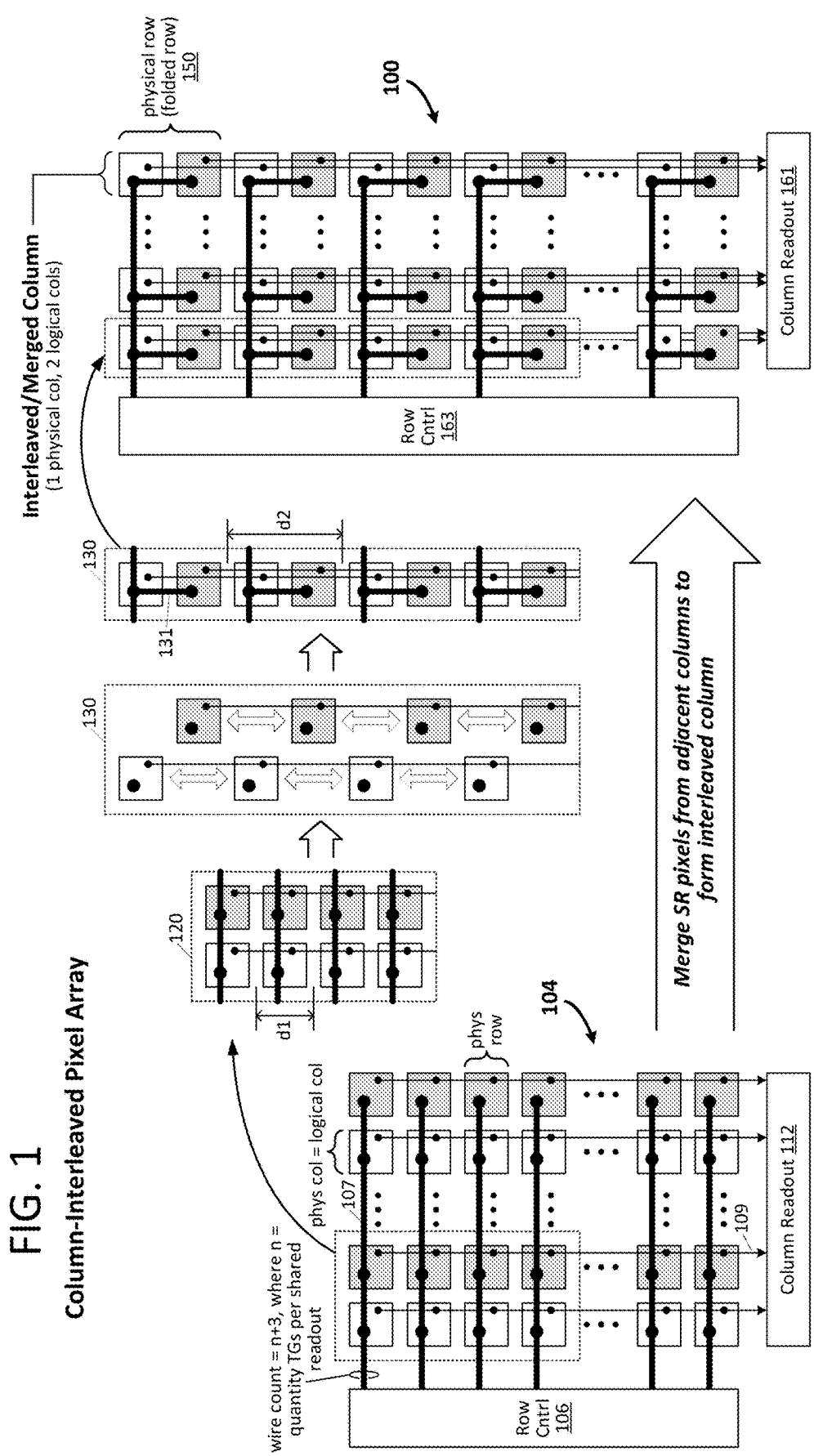
FIG. 1 illustrates an embodiment of image sensor having a column-interleaved pixel array, showing a conceptual progression from a non-interleaved architecture having a one-to-one correspondence between logical pixel columns to an interleaved architecture having multiple logical pixel columns per physical pixel column.

In various embodiments herein, shared-readout pixels conventionally disposed in two or more physical columns of a pixel array are spatially interleaved (merged) within a single physical column to yield a pixel array in which each physical pixel column includes two or more logical columns of shared-readout pixels coupled to respective logical-column output lines. Because two or more neighboring shared-readout pixels within a given merged column drive different column outputs, those shared-readout pixels may be read-out simultaneously and thus controlled by a shared set of row control lines—increasing the spacing available for row-line routing by a factor of 'N', where N is the number of logical pixel columns per physical pixel column (or column output lines coupled to respective sets of shared-readout pixels within a given physical row) and referred to herein as a "merge ratio."

In a number of column-interleaved pixel array embodiments presented herein (and host integrated-circuit image sensors in which those arrays are deployed), multiple shared-readout pixels are disposed in an interleaved structure to increase the horizontal space for the row control signal conductors. In general, the shared-readout pixels have n×m ('n' times 'm') photodetection elements or sub-pixels that may be independently read out (i.e., generation of output signal corresponding to charge accumulated within the sub-pixel photodetection element during an exposure interval) and reset via respective transfer gates, where m is the number of vertical pixels (extending along an axis parallel to the column output lines traversing the pixel array) and n is the number of horizontal pixels (extending along an axis orthogonal to the column output lines). As detailed below, two or more logical columns of shared-readout pixels (i.e., each logical column coupled to a respective column output line) may be integrally or fractionally interleaved within a physical column of the pixel array to yield expanded (row-to-row) control wire spacing. In an integrally interleaved pixel array, all photodetection elements (or sub-pixels) of a shared-readout pixel are collocated within a discrete area (i.e., no overlap with area/footprint of any other shared-readout pixel) so that two or more logical columns of shared-readout pixels are interleaved within a single physical column with granularity of whole shared-readout pixels. In a fractionally interleaved pixel array, by contrast, two or more logical columns of shared-readout pixels are interleaved with sub-pixel granularity (or granularity of sub-pixel groups or clusters) such that the footprint of each shared-readout pixel corresponding to a given logical column overlaps the footprint of at least one shared-readout pixel of another logical column. For example, two halves of the sub-pixels within a shared-readout pixel may be sufficiently offset from one another (in terms of physical layout) to allow placement (interleaving) of half of the sub-pixels within another shared-readout pixel (corresponding to a different logical pixel column) within the offset. These and other features and embodiments are described in further detail below.

FIG. 1 illustrates an embodiment of image sensor 100 having a column-interleaved pixel array, showing a conceptual progression from a non-interleaved architecture 104 having a one-to-one correspondence between logical pixel columns (i.e., each driving a respective column output line) and physical pixel columns to the interleaved architecture (100) having multiple logical pixel columns per physical pixel column. Referring first to non-interleaved architecture 104, a row control circuit 106 drives row control signals to each physical row of shared-readout pixels via respective sets of row control wires 107 to effect parallel readout (i.e., from all shared-readout pixels of a given row) via column-shared output lines 109 (i.e., column output lines extending to column readout circuitry 112), generally sequencing from row to row to effect a rolling shutter (i.e., each physical row readout in a respective "readout" time interval with the total number of readout intervals transpiring within an exposure interval). The row control wire count per physical row of shared-readout pixels is generally given by n+3, where 'n' is the number of photodetection elements per shared-readout pixel that are independently read-able via activation of respective transfer gates (i.e., n=number of transfer-gate (TG) control signals). The '+3' term accounts for a reset line and row-select line (to switch on a reset transistor and row-select transistor, respectively, that constitute, along with a source-follower and capacitive/floating-diffusion node, a shared-readout circuit for driving a signal corresponding to photocharge transferred to the floating diffusion node from a given photodetection element or collection of photodetection elements) and boundary spacing needed between row control wires of neighboring rows. Thus, the area required for routing the row control wires increases linearly with 'n' and, as each wire (metal or other conductive trace) is generally constrained by fabrication rules (typically foundry specific) to have a minimum width 'w' and spacing 's', the maximum number of wires per physical pixel array can be deterministically calculated with that maximum number constraining the shared-readout pixel pitch (i.e., distance d1 as shown in excerpt 120).

Following the conceptual progression shown at 130 the individual shared-readout pixels in adjacent pixel columns (i.e., driving respective column output lines) are offset by the shared-readout pixel pitch to make room for physically merging the pixels of the two original pixel columns excerpted in view 120 into a unified physical column (a 2:1 merge ratio in this example) as shown at 140. The row control lines coupled in common to each pair of pixels originally disposed in the same row (i.e., row control lines 107) remain electrically coupled as in architecture 104—e.g., via the stub connection shown at 131—so that each such pair of pixels remains in the same physical row (i.e., all coupled in common to the same set of row control lines) with that physical row effectively folded in two (according to the merge ratio, N) as shown at 150 within the finalized interleaved-column image sensor 100. Through this architectural change, the space available for row control line routing is expanded by a factor of N (the merge ratio) and, thus from d1 to d2 (2*d1, where '*' denotes multiplication) in the two-column merge example shown. Note that, except for physical layout, the column readout circuitry 161 within column-interleaved architecture 100 may remain unchanged relative to the non-merged implementation at 112—ditto for the row control circuitry 163 (unchanged relative to non-merged implementation at 106) except for possible change in total number of physical rows.

FIG. 2 illustrates considerations bearing on organization of a merged-column pixel array. More specifically, given a merge ratio 'N' and assuming a given aspect ratio 'pa' for individual shared-readout pixels (i.e., pa=SR pixel width/height, where width is the shared-readout pixel dimension along an axis perpendicular to the column readout lines and height is the dimension along the column-readout axis) and that the image array as a whole has a desired aspect ratio 'ar', then the ratio of shared-readout pixels per physical row 'nr' (coupled in common to same row control lines) to the number of shared-readout pixels per logical column 'nc' (i.e., coupled in common to same column output line) may be calculated by nr/nc=ar*N$^2$/pa ('*' denoting multiplication, '/' denoting division, superscript denoting exponential). In the FIG. 2 example, for instance individual shared-readout (SR) pixels within array 180 have four sub-pixels (four photodetection elements or photodiode "storage wells" SW1-SW4 for photocharge accumulation (e$^-$) together with four transfer gates TG1-TG4) clustered about a shared floating diffusion node (FD) with reset, source-follower and row-select transistors (RST, SF, RS) disposed adjacent the photodetection element—as shown in detail view 181—to yield a 1:1 shared-pixel aspect ratio (pa=1). A schematic implementation of the shared-readout pixel (referred to as a 2-horizontal by 2-vertical (2h×2v) "4-way shared-readout pixel in view of the four independently read-able sub-pixels arranged 2×2 along orthogonal axes) is shown at 183. Assuming, for purposes of example, a desired aspect ratio of 1:1 for the pixel array as a whole (ar=1) and merge ratio of 2:1 (N=2), then the number of shared-readout pixels per physical row will be four-times (4×) the number of shared-readout pixels per column output line. That is, nr=4nc as shown in conceptual array 180 so that, upon column merge, the structure shown at 190 is produced, with pixels in a given physical column alternately coupled to different column output lines (col out1, col out2 as shown in detail view 195).

FIG. 3 illustrates another merged-column pixel-organization example, in this case assuming an 8-way shared-readout pixel in a two-horizontal (2h) by four-vertical (4v) layout shown at 210 (with clusters of four sub-pixels disposed about respective floating diffusion regions (FD) that are intercoupled to one another (and thus electrically unified into a single capacitive node) and the gate of the source-follower transistor (SF) via metal layer connection 211) having a pixel aspect ratio of 1:2 (pa=0.5). Assuming the same merge ratio (N=2) and unity array aspect ratio (ar=1) as the FIG. 2 example, then nr=8nc as shown within conceptual array 215 to yield, upon column interleaving/merging, the unity aspect ratio column-interleaved array shown at 220.

Figure 4:
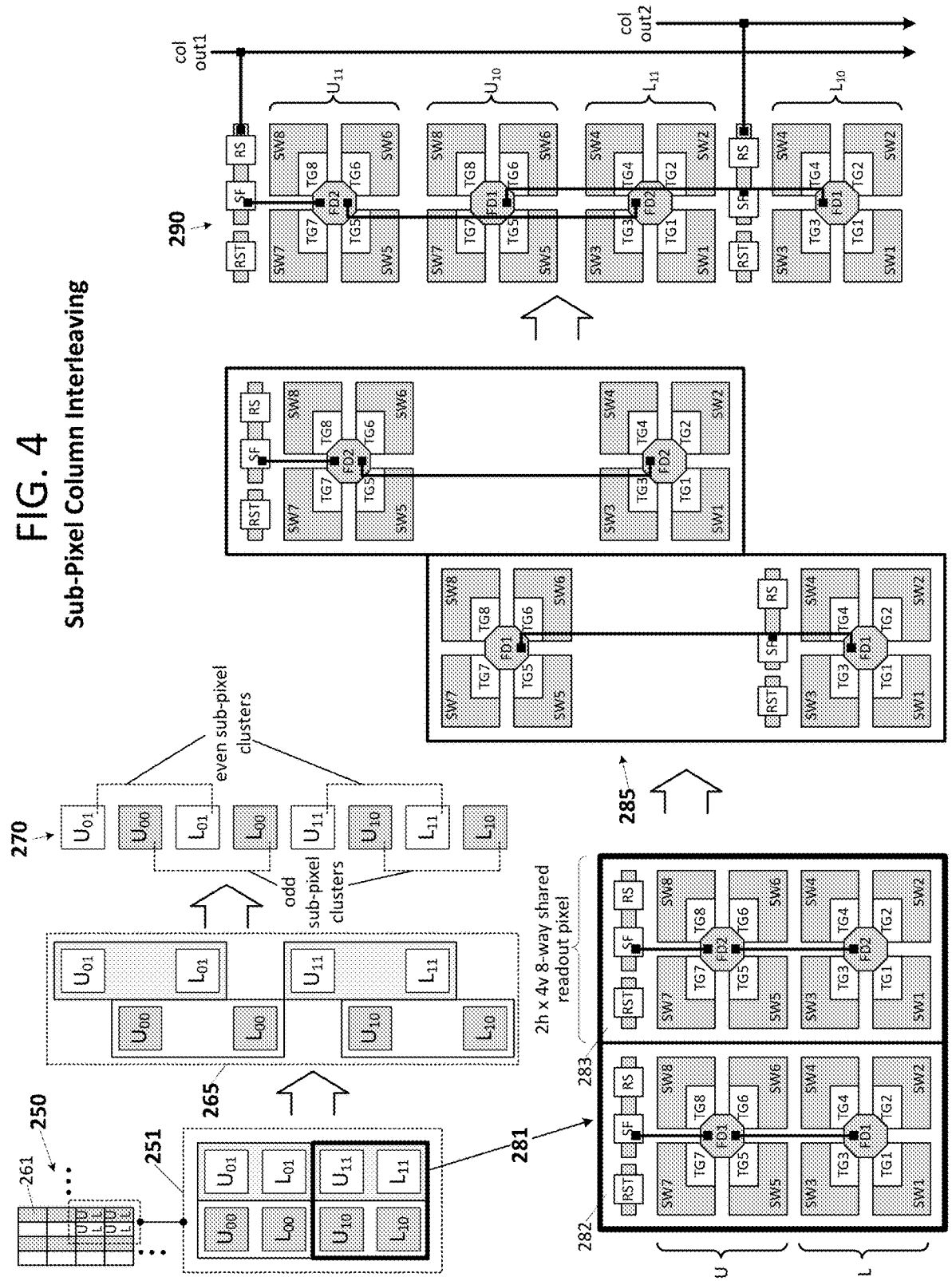
FIG. 4 illustrates an embodiment of a fractional (or sub-pixel) column-interleaved array architecture.

FIG. 4 illustrates an embodiment of a fractional (or sub-pixel) column-interleaved array architecture, showing a progression from a non-interleaved architecture having 8-way shared readout pixels excerpted conceptually at 250—and more specifically from the detail view 251 of four neighboring SR pixels within the non-interleaved architecture 250—to a selected physical column of sub-pixel interleaved logical columns at 270. Referring to the four-SR-pixel detail view at 251, each of the SR pixels (shown at 261 in conceptual array 250) is organized in a 0.5 aspect (2h×4v) such that respective clusters of four sub-pixels are disposed in upper (U) and lower (L) halves of the SR pixel footprint (area). The upper and lower sub-pixel clusters (groups of sub-pixels) in detail view 251 are subscripted to distinguish the non-interleaved physical row and column locations of their respective host SR pixels. As shown conceptually at 265, by (i) offsetting upper and lower clusters within each shared-readout pixel by a distance sufficient for insertion of an upper (or lower) sub-pixel cluster from another shared-readout pixel and (ii) offsetting shared-readout pixels coupled to the same column-output line by a distance sufficient for insertion of the counterpart lower (or upper) sub-pixel cluster from the other shared-readout pixel, the two shared-readout pixels may be column-interleaved at sub-pixel granularity (fractional column interleaving)—in this example, alternating halves of shared-readout pixels are column-interleaved as shown at 270, with all even numbered sub-pixel clusters (counting ordinally from top to bottom along the merged physical pixel column) read-able via a first column output line and all odd-numbered sub-pixel clusters read-able via a second column output line (with a readout circuit dedicated to/shared by each respective pair of even-numbered sub-pixel clusters and a separate readout circuit dedicated to/shared by each respective pair of odd-numbered sub-pixel clusters).

Sub-pixel-cluster-interleaved (fractional column-interleaved) layouts corresponding to the bottom pair of SR pixels within the conceptual views at 251, 265 and 270 are shown at 281, 285 and 290, respectively. That is, layouts of 8-way shared-pixels (282 and 283) are expanded and offset from one another as shown in the conceptual view at 285, and then merged (combined in a direction perpendicular to the column-readout-line axis) to yield the sub-pixel-cluster interleaved result shown at 290. Note that the placements of respective sets of shared-readout/shared-reset transistors (SF, RS, RST) corresponding to the two cluster-interleaved pixels (one set driving col out1, the other driving col out2) may be disposed in any practicable location within the footprint of the two cluster-interleaved shared-readout pixels and thus at locations other than those shown (e.g., SF, RS and RST transistors corresponding to col out2 could be located between sub-pixel clusters $U_{10}$ and $L_{11}$ instead of between $L_{11}$ and $L_{10}$).

Figure 5:
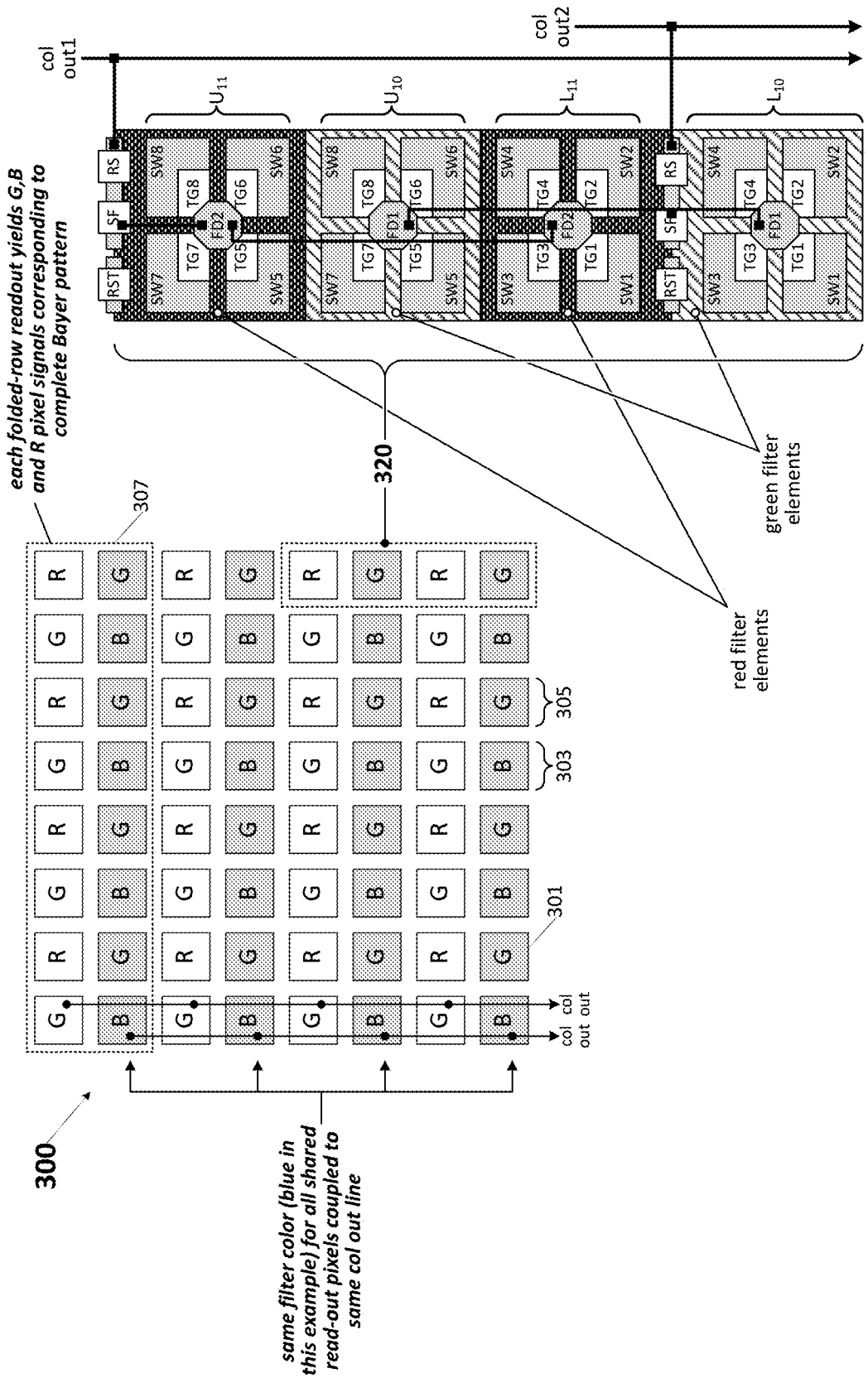
FIG. 5 illustrates an exemplary color filter array (CFA) that may be deployed over the illumination surface (integrated-circuit backside or frontside) of a column-interleaved pixel array according to the various embodiments presented herein.

FIG. 5 illustrates an exemplary color filter array (CFA) 300 that may be deployed over the illumination surface (integrated-circuit backside or frontside) of a column-interleaved pixel array according to the various embodiments herein, and more particularly with respect to the sub-pixel-cluster interleaved pixel array of FIG. 4. In the depicted embodiment, color filter elements 301 within the CFA are arranged in a Bayer pattern with each individual element overlaying (and thus filtering light for) a respective 4-sub-pixel cluster. Because the color filter elements within a physical column of a Bayer-patterned CFA alternate between two colors (green and blue as shown for col 303, or green and red as shown for col. 305), provision of a filter-element 301 per 4-sub-pixel cluster subjects all pixels in a given logical column (i.e., coupled to the same output line) to the same color filtering—that is, all are green filtered, all are blue filtered or all are red filtered. Thus, each column output line of the pixel array conveys signals corresponding exclusively to one color (green, red or blue), and the signals simultaneously read-out over the column output lines of the array (i.e., from a folded physical row as shown in outline 307) include the green-, red-, and blue-filtered signals corresponding to a complete Bayer pattern (two green signals, one red signal and one blue signal corresponding to photo-detection elements or clusters thereof in a Bayer orientation). This effect is shown in layout view 320 with respect to two 4-sub-pixel interleaved SR pixels, driving "red" pixel readout signals via col out1 and "green" pixel readout signals col out2, respectively—the two SR pixels being sub-pixel interleaved as shown at 290 of FIG. 4. Color filter arrays having color filter elements that pass light in wavelength-ranges other than those for green, red and blue may be disposed over the illumination surface of merged-column pixel arrays in other embodiments. For example, color filter arrays may be implemented with filter elements for white (deemed to be a "color" for purposes herein), yellow, magenta, cyan, emerald, or infrared light (or any other practicable range of electromagnetic radiation) instead of or in addition to red, blue and/or green color filter elements. Individual color elements may pass wavelengths in selected ranges (e.g., range of electromagnetic frequencies corresponding to "green" light) or block wavelengths in selected ranges to filter the light incident on a given photodetection element.

The various embodiments of column-interleaved pixel arrays, column readout logic, readout controllers, color filter arrays and so forth disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific shared-readout pixel counts, merge ratios, sub-pixel cluster sizes (i.e., number of sub-pixels per cluster), pixel aspect ratios, sub-pixel counts, pixel layouts, trace-routing arrangements, color filter array patterns and/or dispositions with respect to individual sub-pixels or clusters of sub-pixels, transistor types (e.g., NMOS or PMOS), component elements and the like can be different from those described above in alternative embodiments. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of any configurable parameters may be achieved, for example and without limitation, by loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit image sensor comprising:
a pixel array having:
   a first pixel including (i) first and second floating diffusion nodes interconnected by a first conductor and (ii) first and second photodetection elements coupled respectively to the first and second floating diffusion nodes via respective first and second transfer gates; and
   a second pixel including (i) third and fourth floating diffusion nodes interconnected by a second conductor (ii) third and fourth photodetection elements coupled respectively to the third and fourth floating diffusion nodes via respective third and fourth transfer gates, the third photodetection element being disposed between the first and second photodetection elements and the first, second, third and fourth photodetection elements being traversed by a first common axis; and
row control lines coupled to the pixel array and including (i) a first transfer gate control line coupled in common to the first and third transfer gates and (ii) a second transfer gate control line coupled in common to the second and fourth transfer gates.

2. The integrated-circuit image sensor of claim 1 wherein the second photodetection element is disposed between the third and fourth photodetection elements.

3. The integrated-circuit image sensor of claim 1 wherein the first and second pixels are disposed in a first pixel column of the pixel array, and wherein the pixel array further comprises third and fourth pixels disposed adjacent the first and second pixels in a second pixel column, and wherein the first transfer gate control line traverses the first and second pixel columns and is coupled to fifth and sixth transfer gates within the third and fourth pixels, respectively.

4. The integrated-circuit image sensor of claim 3 wherein the first transfer gate control line comprises:
   a first transfer-gate signal conductor that extends across the pixel array in a direction perpendicular to the first common axis;
   a first lateral conductor that extends parallel to the first common axis and couples the first transfer-gate signal conductor to the first and third transfer gates; and
   a second lateral conductor that extends parallel to the first lateral conductor and couples the first transfer-gate signal conductor to the fifth and sixth transfer gates.

5. The integrated-circuit image sensor of claim 4 wherein the third and fourth pixels additionally include seventh and eighth transfer gates, and wherein the second transfer gate control line comprises:

a second transfer-gate signal conductor that extends across the pixel array parallel to the first transfer-gate signal conductor;
   a third lateral conductor that extends parallel to the first and second lateral conductors and couples the second transfer-gate signal conductor to the second and fourth transfer gates; and
   a fourth lateral conductor that extends parallel to the first, second and third lateral conductors and couples the second transfer-gate signal conductor to the seventh and eighth transfer gates.

6. The integrated-circuit image sensor of claim 1 wherein the first pixel further includes six additional photodetection elements and six additional transfer gates of which (i) a first three of the six additional photodetection elements are coupled to the first floating diffusion node via a first three of the six additional transfer gates, respectively, such that the first floating diffusion node is coupled to four photodetection elements via four respective transfer gates, and (ii) a second three of the six additional photodetection elements are coupled to the second floating diffusion node via a second three of the six additional transfer gates, respectively, such that the second floating diffusion node is coupled to four photodetection elements via four respective transfer gates.

7. The integrated-circuit image sensor of claim 6 wherein the first floating diffusion node is centered between four photodetection elements constituted by the first photodetection element and the first three of the six additional photodetection elements.

8. The integrated-circuit image sensor of claim 6 wherein the first transfer gate and the first three of the six additional transfer gates are disposed radially about the first floating diffusion node.

9. The integrated-circuit image sensor of claim 6 further comprising a color filter array disposed over the pixel array and including (i) a first color filter element disposed over the first photodetection element and the first three of the six additional photodetection elements, and (ii) a second color filter element disposed over the second photodetection element and the second three of the six additional photodetection elements, wherein the first and second color filter elements pass light within a same first range of wavelength.

10. The integrated-circuit image sensor of claim 9 wherein:
   the second pixel further includes six additional photodetection elements and six additional transfer gates disposed of which (i) a first three of the six additional photodetection elements are coupled to the third floating diffusion node via a first three of the six additional transfer gates, respectively, and (ii) a second three of the six additional photodetection elements are coupled to the fourth floating diffusion node via a second three of the six additional transfer gates, respectively; and
   the color filter array further includes (i) a third color filter element disposed over the third photodetection element and the first three of the six additional photodetection elements coupled to the third floating diffusion node, and (ii) a fourth color filter element disposed over the fourth photodetection element and the second three of the six additional photodetection elements coupled to the fourth floating diffusion node, wherein the third and fourth color filter elements pass light within a second range of wavelengths that is different than the first range of wavelengths.

11. The integrated-circuit image sensor of claim 10 wherein the first range of wavelengths corresponds to green light and the second range of wavelengths corresponds to either red light or blue light.

12. The integrated-circuit image sensor of claim 1 further comprising first and second readout liens that extend parallel to the first common axis, and wherein the first pixel further includes a first transistor readout circuit coupled between the first readout line and a first electrical node formed by interconnection of the first and second floating diffusion nodes, and wherein the second pixel further includes a second transistor readout circuit coupled between the second readout line and a second electrical node formed by interconnection of the third and fourth floating diffusion nodes.

13. The integrated-circuit image sensor of claim 12 further comprising a color filter array disposed over the pixel array to filter light incident upon the first and second pixels such that output signals generated by the First readout circuit on the first readout line correspond exclusively to incident light within a first range of wavelengths and output signals generated by the second readout circuit on the second readout line correspond exclusively to incident light within a second range of wavelengths.

14. The integrated-circuit image sensor of claim 13 wherein the first and second pixels are disposed in a first pixel column of the pixel array and the integrated-circuit image sensor further comprises (i) third and fourth pixels disposed adjacent the first and second pixels, respectively, in a second pixel column of the pixel array and (ii) third and fourth readout lines coupled respectively to the third and fourth pixels, and wherein the first transfer gate control line traverses the first and second pixel columns and is coupled to fifth and sixth transfer gates within the third and fourth pixels, respectively, and wherein the color filter array further filters light incident upon the third and fourth pixels such that output signals generated by the third and fourth pixels on the third and fourth readout lines correspond exclusively to incident light within a third range of wavelengths and exclusively to incident light within the first range of wavelengths, respectively.

15. The integrated-circuit image sensor of claim 14 wherein the first range of wavelengths corresponds to green light, the second range of wavelengths corresponds to blue light, and the third range of wavelengths corresponds to red light.

\* \* \* \* \*